E. J. ROHRBACHER.
HOSE CLAMP.
APPLICATION FILED FEB. 20, 1918.

1,294,951.

Patented Feb. 18, 1919.

Inventor
Edward J. Rohrbacher
By Henry L. Reynolds.
Attorney

United States Patent Office.

EDWARD J. ROHRBACHER, OF SEATTLE, WASHINGTON.

HOSE-CLAMP.

1,294,951.   Specification of Letters Patent.   Patented Feb. 18, 1919.

Application filed February 20, 1918. Serial No. 218,198.

*To all whom it may concern:*

Be it known that I, EDWARD J. ROHRBACHER, a citizen of the United States, and resident of the city of Seattle, county of King, and State of Washington, have invented certain new and useful Improvements in Hose-Clamps, of which the following is a specification.

My invention relates to hose clamps and consists of a clamp which is provided with means whereby it may interlockingly engage parts thereof to bind it in place on a hose and which will fit upon hose of considerable difference in size.

The object of my invention is to provide a hose clamp of cheap first cost and which may be applied and locked without using any unusual or special tools, and which will fit various sizes of hose.

My invention consists of the novel parts and combinations of parts which will be herein set forth and then particularly defined by the claims.

In the accompanying drawings I have shown my invention in the type of construction which is now most preferred by me.

The strap which forms my hose clamp is composed of thin sheet metal. The main body thereof, 1, has tongues 10 stamped therefrom, alternating with holes 11. These tongues extend toward the head 2.

Figure 1:
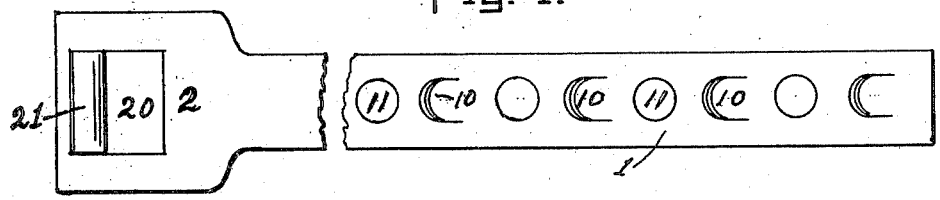
Figure 1 is a face view of the blank from which the clamp is made.
Figure 2:
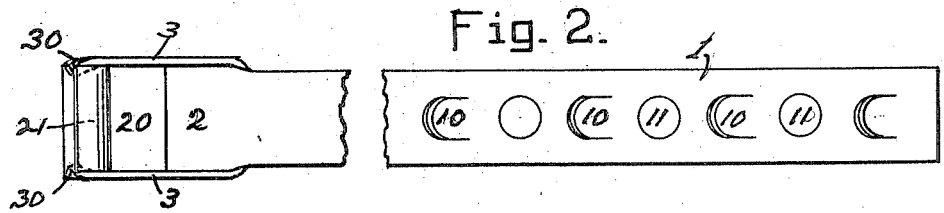
Fig. 2 shows a face view and Fig. 3 an edge view of a clamp in condition for applying to a hose, a portion of the head being in section in Fig. 3.
Figure 3:
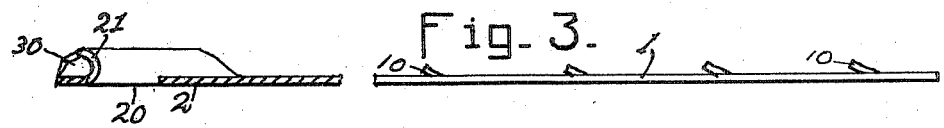
Figure 4:
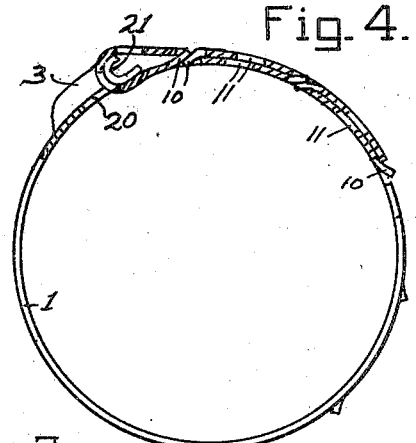
Fig. 4 shows a view of a clamp as applied about a hose.

The head 2 has a hole 20, of a width to receive the strap body 1, the outer edge of this hole, that is at the edge which is away from the body of the strap, being rolled over backward, as is clearly shown in Figs. 2, 3 and 4. This rolled-over edge 21 may be simply the tongue which is stamped from the hole 20. This provides a rounded and enlarged surface over which to draw the strap when securing the clamp in place on a hose.

I may also bend the side bars 3 of the head up, as is shown in the same figures, and force their outer ends or corners, 30, under the outer side of the bent tongue 21, thus reinforcing and strengthening it.

In use, the body 1 of the strap is passed about the hose with the side toward which the tongues 10 are pressed, outward. The end of the strap is passed through the hole 20 and bent backward, drawing it taut and forcing the end down until the end of one or more of the tongues either interlock with the projecting tongues of that part of the strap which lies against the hose, or one of the holes 11, as is shown in Fig. 2.

Figure 5:
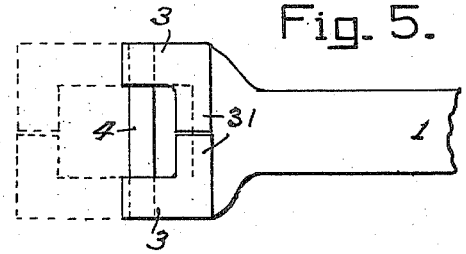
Fig. 5 is a face view of the head of a modified type of construction.
Figure 6:
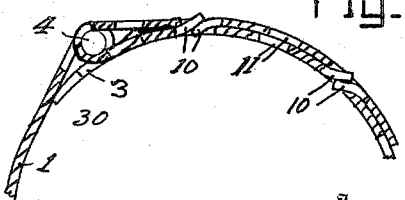
Fig. 6 shows a strap of the construction shown in Fig. 5, as it would appear applied to a hose.

The strap shown in Figs. 5 and 6 differs from that before described in having a pin 4 held by bending the side bars 3 over its ends. These side bars 3 may also have side extensions 31 at their ends, these being placed on the inner side as it is applied to the hose. These lugs 31 will interlockingly engage the strap 1 to prevent further stretch, in case the strain is sufficient to cause the eyes to open. In Fig. 5 the shape of the blank at the head end is shown by dotted lines.

In applying the hose clamp the strap is passed through the hole 20 in the head, drawn taut and bent back until either two tongues interlock or a tongue enters a hole 11. To draw the strap tight a nail may be passed through a hole of the outer layer and engaged with a hole in the inner layer, the nail acting as a lever to draw the strap tight.

Figure 7:
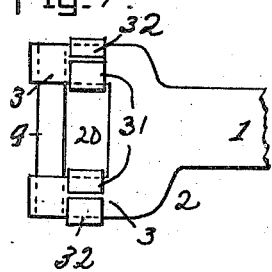
Figs. 7 and 8 represent respectively in completed and in blank form, a further modification in the structure of the head.
Figure 8:
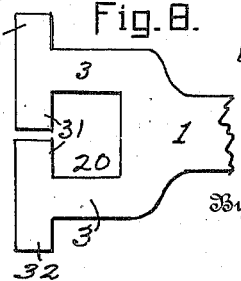

The strap head shown in Figs. 7 and 8, rather closely resembles that shown in Figs. 5 and 6. In outline the blank, before bending, is the same as that of Fig. 5, with the addition of outwardly projecting lugs 32. In bending up the side bars 3 to hold the pin 4, this is done at a point which will bring the ends of the lugs 31 and 32 just outside of the inner edge of the hole 20 and the lugs 31 and 32 are bent over the side bars 3, and clamped thereon, as is shown in Fig. 7. This greatly strengthens the eyes which hold the pin 4.

What I claim as my invention is:

1. A hose clamp comprising a strap-like body of sheet metal provided with an enlarged head having a hole therein for the strap to pass through, the strap having tongues stamped therefrom and pointing toward the head and the side of the head farthest from the strap having its edge rolled over to form a rounded edge for the hole, and the side bars of the head being bent up and with their outer ends bent under the ends of the said rolled outer edge of the hole.

2. A hose clamp comprising a strap of sheet metal having its body provided with means for interlocking the parts thereof when bent back upon itself and a transverse bar carried by one end of the body about which to pass the body, said bar having a diameter which is large relative to the thickness of the metal composing the body.

3. A hose clamp of sheet metal provided with means for interlocking the main body thereof when bent back upon itself and a transverse bar carried by one end of the body about which to pass the body, said bar having a diameter which is large relative to the thickness of the metal, which composes the body, the body of the strap having holes adapted to receive a nail or like bar to act as a lever to draw the strap over said transverse bar.

Signed at Seattle, Washington, this 14th day of February, 1918.

EDWARD J. ROHRBACHER.